US012786665B2

(12) United States Patent
Woo et al.

(10) Patent No.: US 12,786,665 B2
(45) Date of Patent: Nov. 3, 2026

(54) METHOD AND SYSTEM FOR DETERMINING LOCATION OF MOBILE DEVICE

(71) Applicant: Bytedance Inc., Wilmington, DE (US)

(72) Inventors: Geoffrey H. Woo, San Francisco, CA (US); Jonathan R. Zhang, San Franscisco, CA (US); Jonathan D. Chang, Palo Alto, CA (US)

(73) Assignee: Bytedance Inc., Wilmington, DE (US)

( * ) Notice: Subject to any disclaimer, the term of this patent is extended or adjusted under 35 U.S.C. 154(b) by 274 days.

(21) Appl. No.: 18/767,242

(22) Filed: Jul. 9, 2024

(65) Prior Publication Data

US 2025/0008299 A1 Jan. 2, 2025

Related U.S. Application Data

(63) Continuation of application No. 17/654,305, filed on Mar. 10, 2022, now Pat. No. 12,082,071, which is a continuation of application No. 16/701,992, filed on Dec. 3, 2019, now Pat. No. 11,304,032, which is a continuation of application No. 16/018,673, filed on Jun. 26, 2018, now Pat. No. 10,531,235, which is a continuation of application No. 15/452,193, filed on Mar. 7, 2017, now Pat. No. 10,034,139, which is a continuation of application No. 14/949,750, filed on Nov. 23, 2015, now Pat. No. 9,628,957, which is a continuation of application No. 13/835,276, filed on Mar. 15, 2013, now Pat. No. 9,226,110.

(60) Provisional application No. 61/618,693, filed on Mar. 31, 2012.

(51) Int. Cl.
*H04W 4/02* (2018.01)
*H04W 4/029* (2018.01)
*H04W 48/04* (2009.01)
*H04W 64/00* (2009.01)

(52) U.S. Cl.
CPC ............. *H04W 4/027* (2013.01); *H04W 4/02* (2013.01); *H04W 4/025* (2013.01); *H04W 4/029* (2018.02); *H04W 48/04* (2013.01); *H04W 64/00* (2013.01)

(58) Field of Classification Search
CPC ....... H04W 4/027; H04W 4/029; H04W 4/02; H04W 4/025; H04W 48/04; H04W 64/00
USPC ....................................................... 455/456.1
See application file for complete search history.

(56) References Cited

U.S. PATENT DOCUMENTS

| | | | |
|---|---|---|---|
| 5,249,157 | A | 9/1993 | Taylor |
| 5,825,759 | A | 10/1998 | Liu |
| 5,991,302 | A | 11/1999 | Berl et al. |
| 6,285,319 | B1 | 9/2001 | Rose |

(Continued)

OTHER PUBLICATIONS

U.S. Appl. No. 17/654,305, filed Mar. 10, 2022, U.S. Pat. No. 12,082,071, Issued.

(Continued)

*Primary Examiner* — Mark G. Pannell
(74) *Attorney, Agent, or Firm* — Alston & Bird LLP

(57) ABSTRACT

Provided herein are system, methods and computer readable storage media in facilitating the determination of a location of at least one mobile device. In providing such functionality, the system may be configured to, for example, receive contextual data corresponding to a contextual state of a mobile device, determine the location of a mobile device, and transmit the location of the mobile device to at least one other mobile device.

20 Claims, 7 Drawing Sheets

(56) References Cited

U.S. PATENT DOCUMENTS 6,351,218 B1 2/2002 Smith
7,184,047 B1 2/2007 Crampton
7,424,225 B1 * 9/2008 Elliott ................ H04B 7/18504 398/118
7,486,201 B2 2/2009 Kelly et al.
7,848,765 B2 12/2010 Phillips et al.
7,949,330 B2 5/2011 Yuhara et al.
8,000,726 B2 8/2011 Altman et al.
8,019,692 B2 9/2011 Rosen
8,102,253 B1 1/2012 Brady, Jr.
8,108,144 B2 1/2012 Forstall et al.
8,108,414 B2 1/2012 Stackpole
8,358,609 B1 1/2013 Cona et al.
8,380,219 B1 2/2013 Wick et al.
8,588,821 B1 11/2013 Hewinson
8,688,143 B2 4/2014 Steenstra et al.
9,723,192 B1 * 8/2017 Sammons .............. H04N 23/66
10,852,918 B1 12/2020 Voss
2003/0069692 A1 4/2003 Krasner et al.
2003/0100982 A1 5/2003 Rao et al.
2004/0010553 A1 1/2004 Katz et al.
2004/0026574 A1 2/2004 Seifert
2004/0111200 A1 6/2004 Rao et al.
2004/0192339 A1 9/2004 Wilson et al.
2005/0060417 A1 3/2005 Rose
2006/0068822 A1 * 3/2006 Kalhan ................. H04W 84/18 455/517
2006/0155461 A1 7/2006 Cho
2006/0227047 A1 10/2006 Rosenberg
2006/0287817 A1 12/2006 Nagel
2007/0078595 A1 4/2007 Song
2007/0190494 A1 * 8/2007 Rosenberg .............. A63F 13/79 463/40
2007/0281689 A1 12/2007 Altman et al.
2007/0281690 A1 12/2007 Altman et al.
2007/0281716 A1 12/2007 Altman et al.
2007/0282621 A1 12/2007 Altman et al.
2008/0070593 A1 3/2008 Altman et al.
2008/0082613 A1 4/2008 Szeto et al.
2008/0102809 A1 5/2008 Beyer
2008/0231507 A1 9/2008 Burckart et al.
2008/0263460 A1 10/2008 Altberg et al.
2008/0284588 A1 11/2008 Kim et al.
2009/0017803 A1 1/2009 Brillhart et al.
2009/0103515 A1 4/2009 Pointer
2009/0125394 A1 5/2009 Otto et al.
2009/0210271 A1 8/2009 Abrams
2009/0232129 A1 9/2009 Wong et al.
2009/0265755 A1 10/2009 Hamilton et al.
2009/0286526 A1 11/2009 Matsunaga
2010/0037151 A1 2/2010 Ackerman et al.
2010/0085947 A1 4/2010 Ringland et al.
2010/0144368 A1 6/2010 Sullivan et al.
2010/0274569 A1 10/2010 Reudink
2010/0279713 A1 11/2010 Dicke
2010/0314487 A1 * 12/2010 Boelitz .................... B64G 1/14 701/13
2011/0106442 A1 5/2011 Desai et al.
2011/0129077 A1 6/2011 Prakash et al.
2011/0143774 A1 6/2011 Mcnamara et al.
2011/0154383 A1 6/2011 Hao et al.
2011/0210866 A1 * 9/2011 David .................... G08G 1/163 340/901
2011/0231016 A1 9/2011 Goulding
2011/0250874 A1 10/2011 Shah et al.
2011/0252344 A1 10/2011 van Os
2011/0279261 A1 11/2011 Gauger et al.
2012/0083285 A1 4/2012 Shatsky et al.
2012/0326922 A1 * 12/2012 Yang ....................... G01S 19/34 342/357.3
2013/0253980 A1 9/2013 Blom et al.
2013/0273977 A1 10/2013 Kim et al.
2014/0005929 A1 * 1/2014 Gale ................ G08G 1/096716 701/431
2014/0099978 A1 * 4/2014 Egner ................... H04W 4/027 455/456.6
2015/0193819 A1 7/2015 Chang
2016/0295384 A1 10/2016 Shan et al.
2017/0048686 A1 2/2017 Chang et al.
2017/0153864 A1 * 6/2017 Zhou ..................... A63F 13/352
2021/0392098 A1 12/2021 Gorkin et al.
2021/0392459 A1 12/2021 Gorkin et al.
2021/0392460 A1 12/2021 Gorkin et al.

OTHER PUBLICATIONS

U.S. Appl. No. 16/701,992, filed Dec. 3, 2019, U.S. Pat. No. 11,304,032, Issued.

U.S. Appl. No. 16/018,673, filed Jun. 26, 2018, U.S. Pat. No. 10,531,235, Issued.

U.S. Appl. No. 15/452,193, filed Mar. 7, 2017, U.S. Pat. No. 10,034,139, Issued.

U.S. Appl. No. 14/949,750, filed Nov. 23, 2015, U.S. Pat. No. 9,628,957, Issued.

U.S. Appl. No. 13/835,276, filed Mar. 15, 2013, U.S. Pat. No. 9,226,110, Issued.

* cited by examiner

METHOD AND SYSTEM FOR DETERMINING LOCATION OF MOBILE DEVICE

CROSS-REFERENCE TO RELATED APPLICATION

This application is a continuation of U.S. patent application Ser. No. 17/654,305, which was filed Mar. 10, 2022, and entitled "Method and System for Determining Location of Mobile Device," which is a continuation of Ser. No. 16/701,992, which was filed Dec. 3, 2018 and has issued as U.S. Pat. No. 11,304,032, entitled "Method and System for Determining Location of Mobile Device," which is a continuation of U.S. patent application Ser. No. 16/018,673, which was filed Jun. 26, 2018 and has issued as U.S. Pat. No. 10,531,235, entitled "Method and System for Determining Location of Mobile Device," which is a continuation of U.S. patent application Ser. No. 15/452,193, which was filed Mar. 7, 2017 and has issued as U.S. Pat. No. 10,034,139, entitled "Method and System for Determining Location of Mobile Device," which is a continuation of U.S. patent application Ser. No. 14/949,750, which was filed on Nov. 23, 2015 and has issued as U.S. Pat. No. 9,628,957, entitled "Method and System for Determining Location of Mobile Device", which is a continuation of U.S. patent application Ser. No. 13/835,276, which was filed on Mar. 15, 2013 and has issued as U.S. Pat. No. 9,226,110, entitled "Method and System for Determining Location of Mobile Device," and claims the benefit of U.S. Provisional Patent Application No. 61/618,693, filed Mar. 31, 2012, entitled "Method and system for power-efficient location tracking for location-based services on mobile devices".

The entirety of the disclosures of each of the above-referenced applications is hereby incorporated by reference for all purposes.

TECHNICAL FIELD

The present description relates to determining a location of a mobile device. This description more specifically relates to dynamically determining the location of at least one mobile device using social, local and other contextual parameters of a user and the at least one mobile device.

BACKGROUND

Location based services allow for a user to see where friends, people with common interests, venues, merchants and/or other points of interests are located with respect to the user. In addition, social networking or social discovery services may be enhanced by information provided by the location of a mobile device, such as providing services based upon the number of mobile devices located within a particular location.

Many location based services require a user to "check-in" or provide manual updates corresponding to the location of the mobile device. Accordingly, manual updates and/or "check-in" procedures may not provide the resolution, fidelity, convenience, or efficiency that an automatic, passive location tracking service provides. In addition, some procedures may determine a location of a mobile device based on arbitrary parameters, such as an arbitrary time interval. Accordingly, there is a need for a system and method for determining the location of a mobile device in an efficient and practical manner.

BRIEF SUMMARY

In general, example embodiments of the present invention provide herein systems, methods and computer readable storage media for facilitating the determination of the location of a mobile device. Among other things, embodiments discussed herein can be configured to receive contextual data from at least a first mobile device, determine the velocity and acceleration of the first mobile device, predict a future location of the first mobile device, and determine a new location of the first mobile device. Some embodiments may be configured to transmit data corresponding to the new location of the first mobile device to at least one other mobile device. Some embodiments discussed herein can be configured to aid in predicting the location of a mobile device, which promotes efficient location based tracking of a plurality of mobile devices.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

Figure 1:
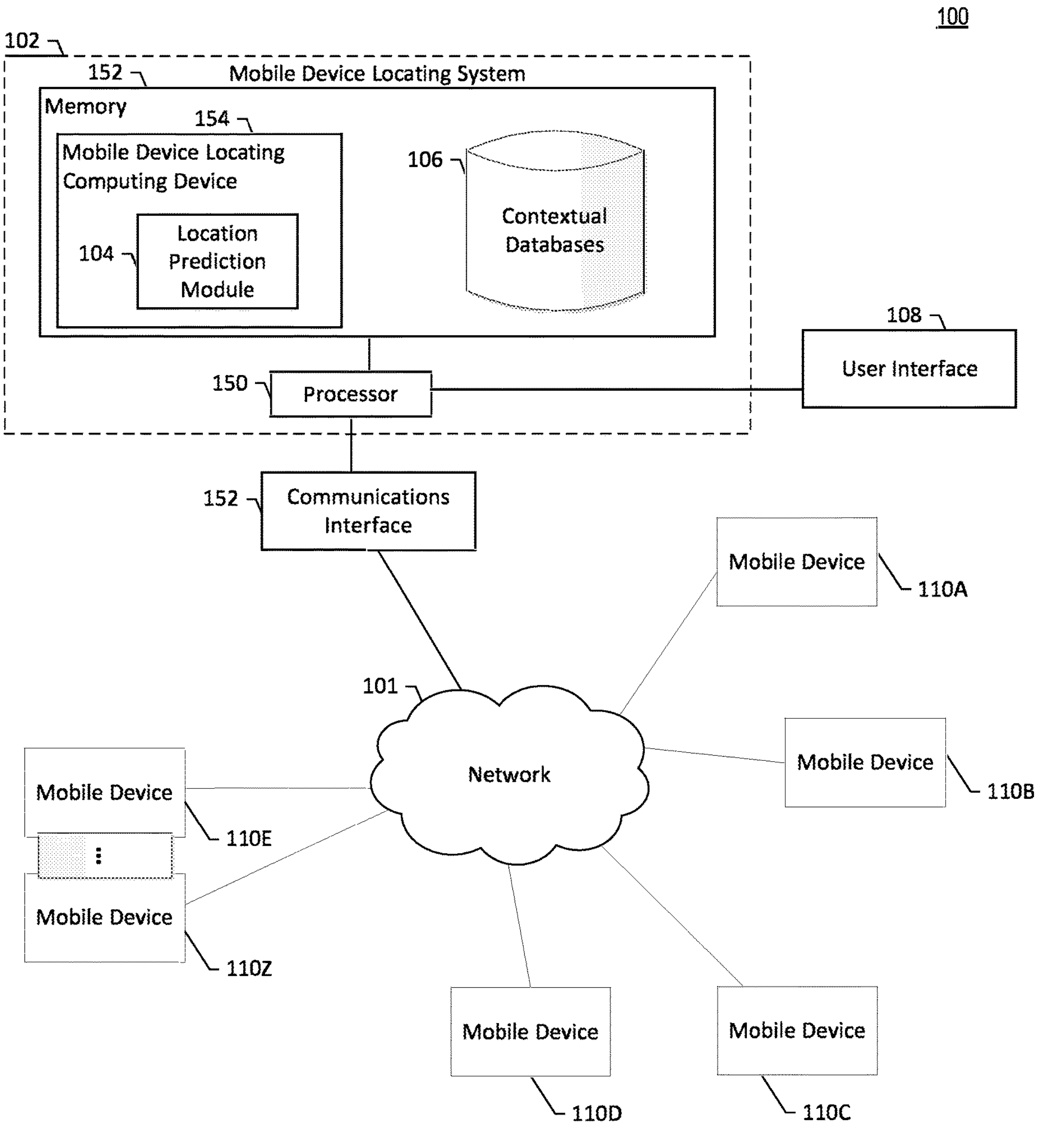
Figure 2:
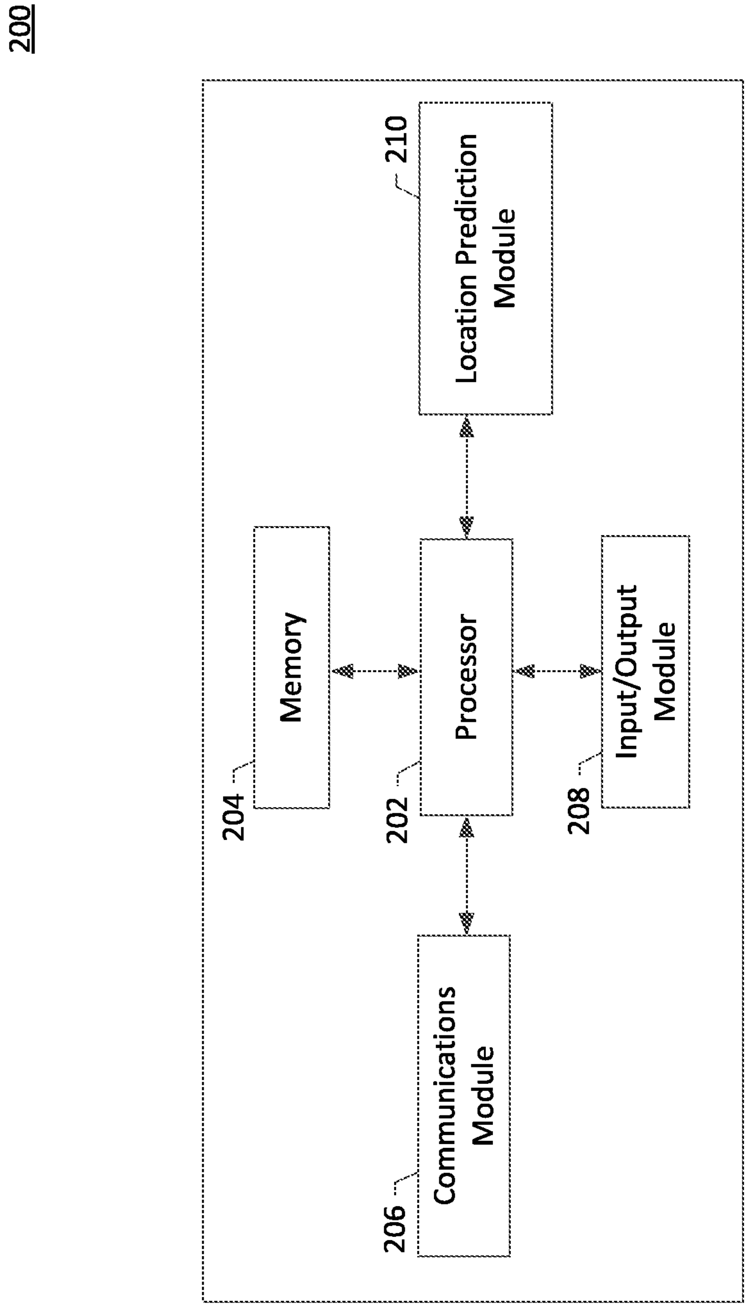
Figure 3:
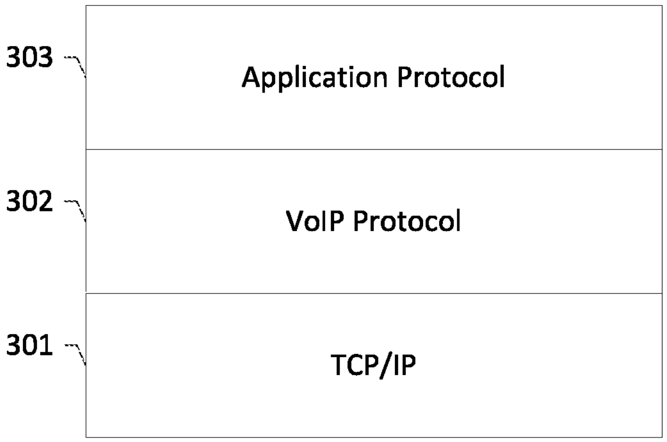
Figure 4:
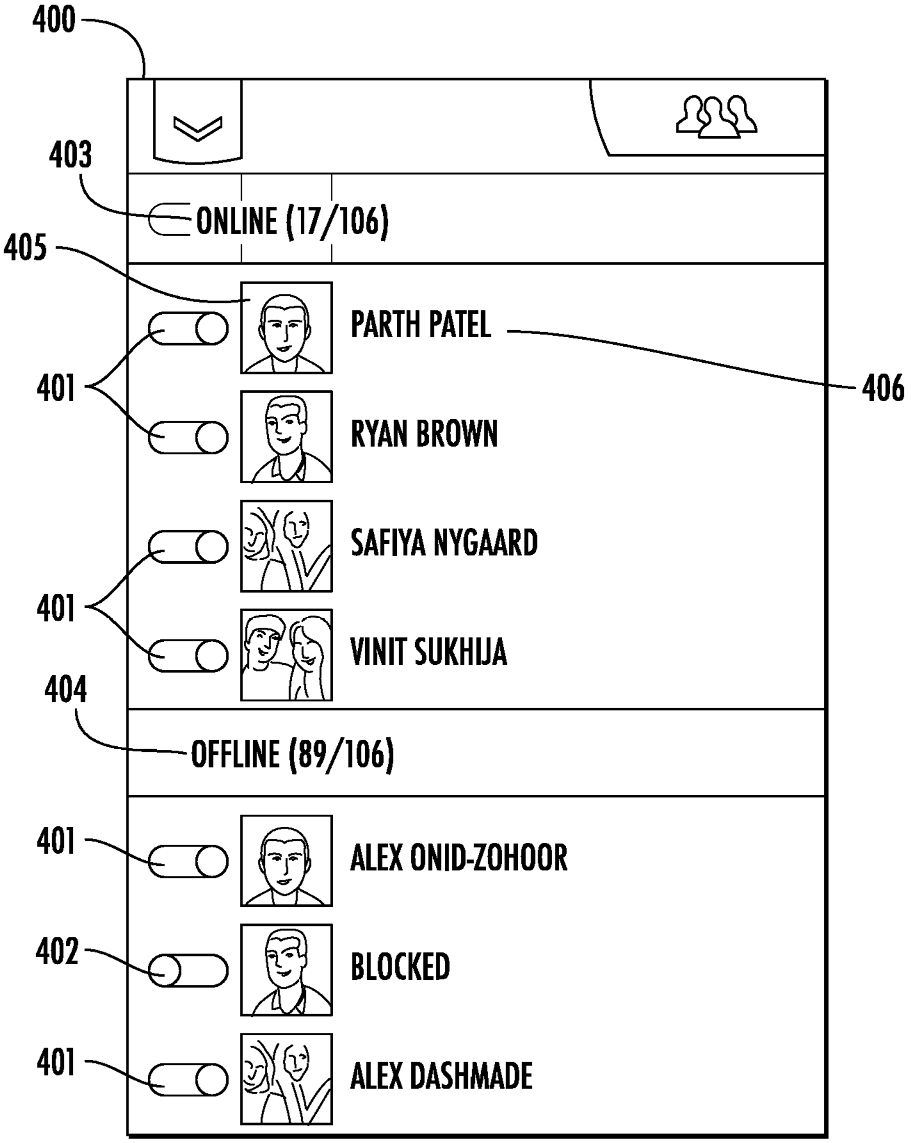
Figure 5:
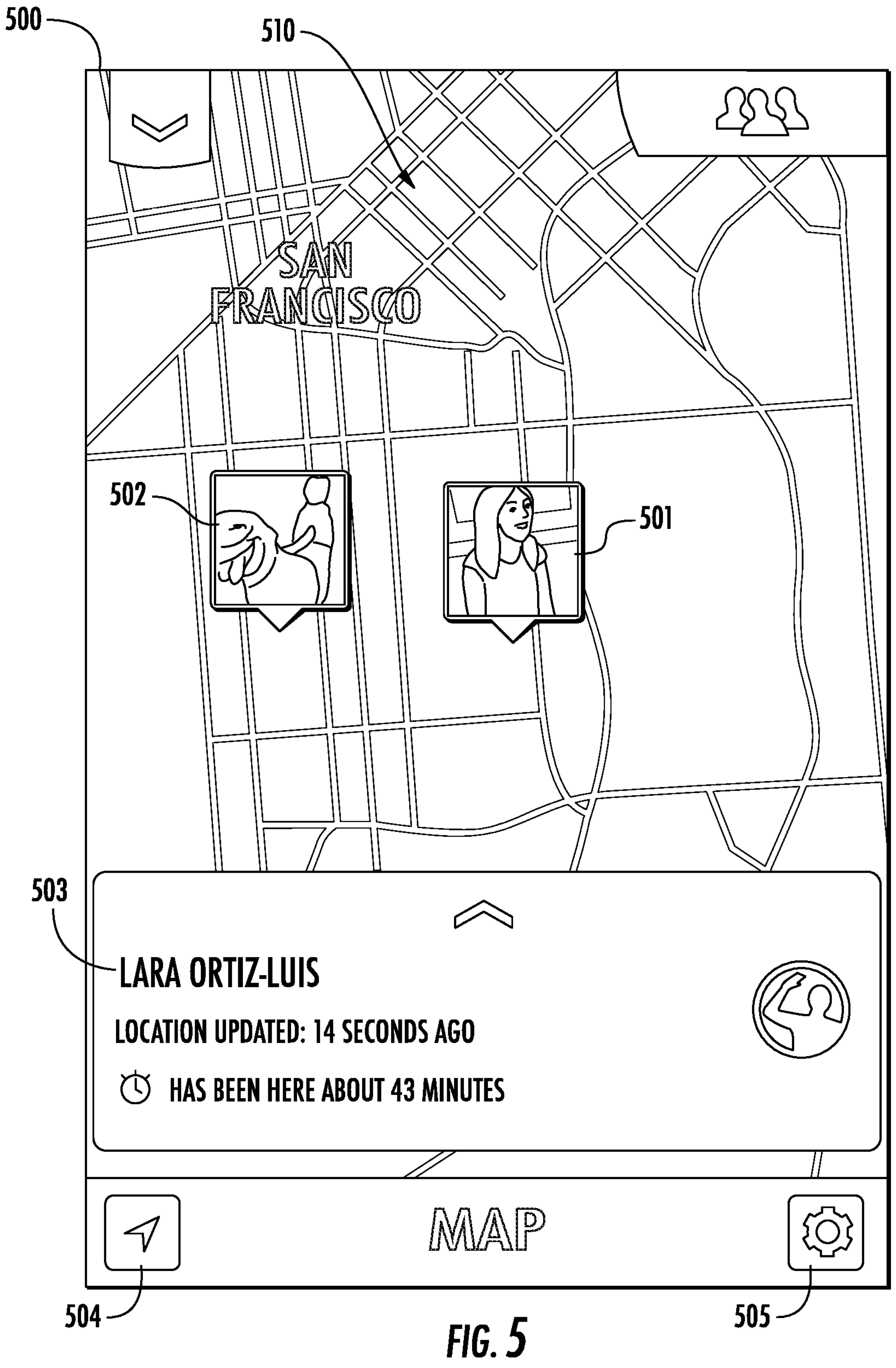
Figure 6:
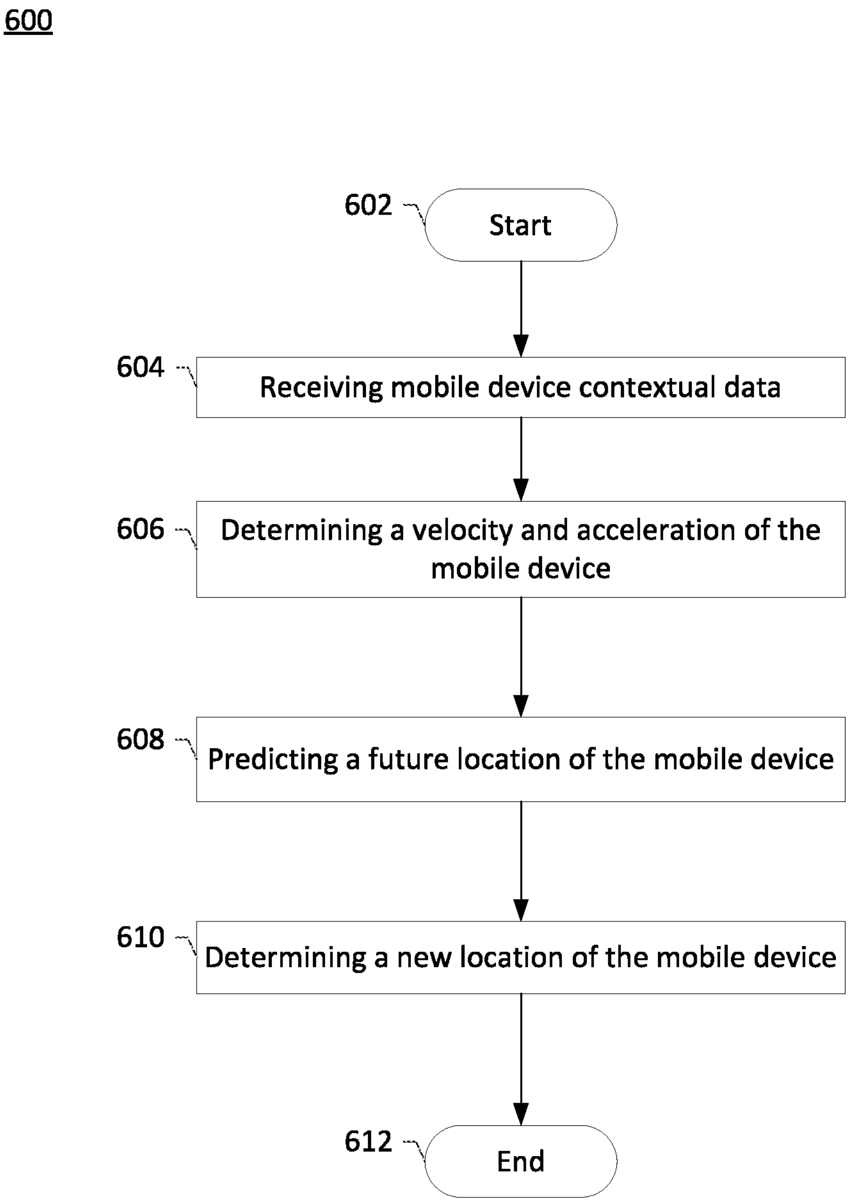
Figure 7:
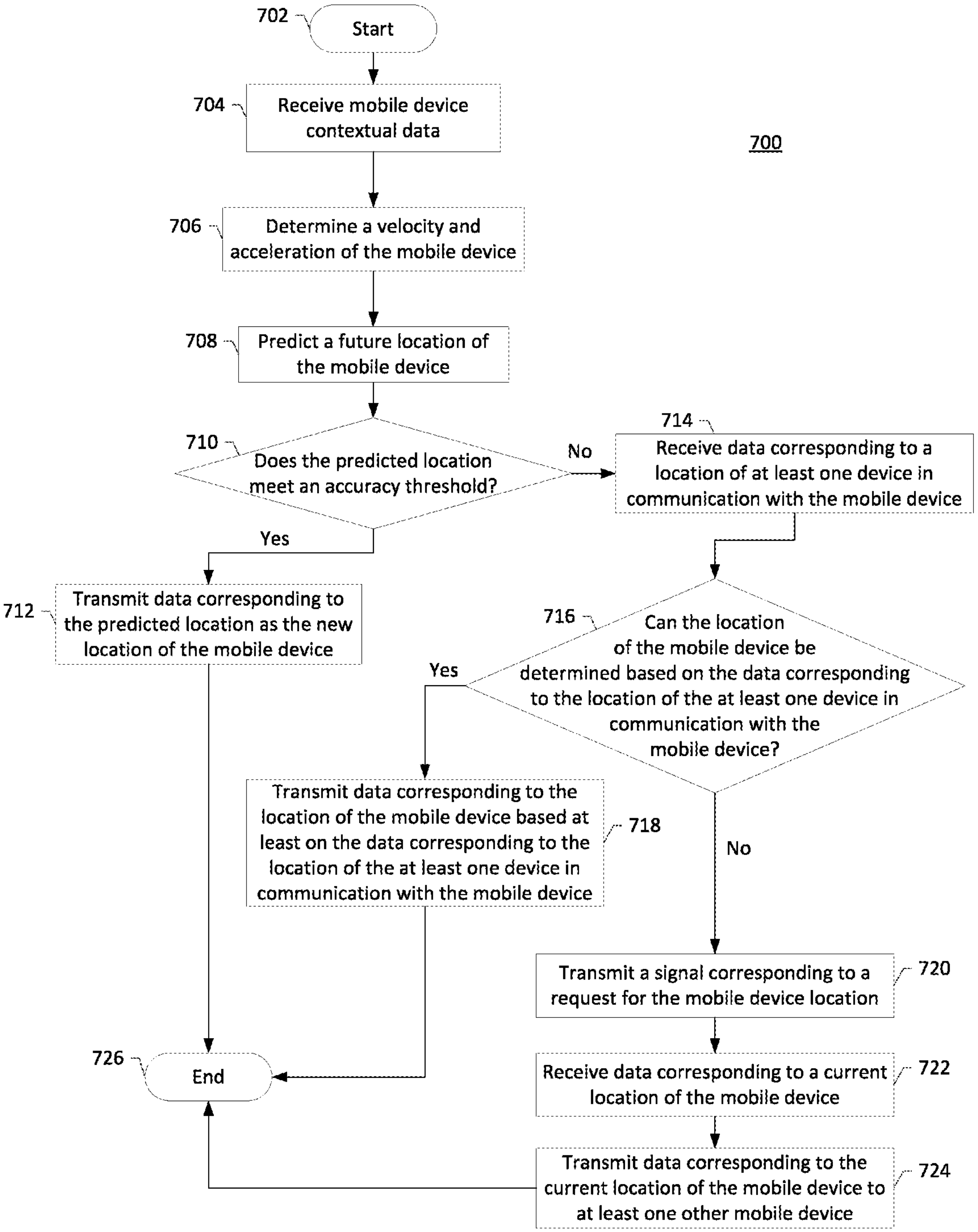

Having thus described embodiments of the invention in general terms, reference will now be made to the accompanying drawings, which are not necessarily drawn to scale, and wherein:

FIG. 1 illustrates an example system in accordance with some embodiments discussed herein;

FIG. 2 illustrates a block diagram of circuitry which may be included in a mobile device locating system and/or a mobile device according to an example embodiment;

FIG. 3 illustrates a block diagram of a protocol stack used by the mobile device locating system and/or mobile device according to an example embodiment;

FIG. 4 illustrates a screen capture of an interface for controlling sharing permissions according to an example embodiment;

FIG. 5 illustrates a screen capture of a map interface according to an example embodiment;

FIG. 6 illustrates a flow chart detailing a method of determining a location of a mobile device according to an example embodiment; and FIG. 7 illustrates a flow chart detailing a method of determining a location of a mobile device according to an example embodiment.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different, or fewer components may be provided.

As discussed herein, a first user may request the location of at least one mobile device of another user. For example, a group of friends or acquaintances may each have a mobile device, such as a smartphone, a laptop, a mobile computing device, a tablet computing device, and/or the like. Accordingly, in an instance where the group of friends may decide to meet one another, one person may request the location of at least one mobile device of one friend so as to determine where the friend is located. In some embodiments, the person may request the location of at least one mobile device of one friend so as to accurately predict and/or determine where the friend may be in the near future.

In this regard, embodiments discussed herein may be configured to advantageously provide for efficient location-based tracking of a number of mobile devices. For example, embodiments of the present invention may advantageously provide for predicting a new location of a mobile device without the mobile device having to consume power to transmit the location of the mobile device each time the location of the mobile device is requested. Accordingly, embodiments may provide for location-based tracking that is highly accurate while preserving the power of a mobile device and/or minimizing the power usage by the mobile device.

Referring to FIG. 1, FIG. 1 illustrates a system 100 including an example network architecture, which may include one or more devices and sub-systems that are configured to implement some embodiments discussed herein. A number of users may each have a mobile device 110A,110Z, such as a smartphone, a laptop, a mobile computing device, a tablet computing device, and/or the like. As shown in FIG. 1, mobile device locating system 102 may be coupled to one or more mobile devices 110A, 110Z via a communications interface 152 that is configured to communicate with network 101.

Network 101 may include any wired or wireless communication network including, for example, a wired or wireless local area network (LAN), personal area network (PAN), metropolitan area network (MAN), wide area network (WAN), mobile broadband network, or the like, as well as any hardware, software and/or firmware required to implement it (such as, e.g., network routers, etc.). For example, network 101 may include a cellular telephone, a 202.11, 202.16, 202.20, and/or WiMax network. Further, the network 101 may include a public network, such as the Internet, a private network, such as an intranet, or combinations thereof, and may utilize a variety of networking and/or communication protocols now available or later developed including, but not limited to TCP/IP based networking protocols.

In this regard, FIG. 3 illustrates one example protocol stack for communicating between the mobile devices 110A, 110Z and the mobile device locating system 102. According to one embodiment, mobile device locating system 102 and at least one mobile device 110A may communicate with one another by maintaining an open socket connection. In one embodiment, the protocol stack 300 may be configured to maintain the open socket connection between the mobile device locating system 102 and at least one mobile device. As shown in FIG. 3, the protocol stack 300 may include a typical base datagram protocol for data communication, such as a TCP/IP based networking protocol 301. In addition, the protocol stack 300 may include a protocol configured to be prioritized for communication between the mobile device locating system 102 and the at least one mobile device, such as, for example, a VoIP protocol 302.

As discussed herein, embodiments of the present invention may advantageously provide for efficient location tracking of a mobile device. In one embodiment, the VoIP protocol 302 may be configured for communicating format and headers for a datagram, such as those communicated by the base datagram protocol. The at least one mobile device 110A, 110Z may maintain an open socket connection between the mobile device locating system 102 and the at least one mobile device with a VoIP protocol 302. In some embodiments, the at least one mobile device 110A, 110Z may be configured to transmit data using the VoIP protocol 302 while being in a low powered state. As such, the at least one mobile device 110A, 110Z may be configured to maintain the open socket connection between the at least one mobile device and mobile device locating system 102 without being in a high-powered state. Further, the at least one mobile device 110A, 110Z may be configured to maintain the open socket connection between the at least one mobile device and the mobile device locating system 102 without using the TCP/IP based networking protocol. As such, the mobile device locating system 102 and the mobile device 110A, 110Z may be configured to advantageously provide for location based tracking of a mobile device in a power efficient manner. According to some embodiments, the protocol stack 300 may further include an application specific protocol 303 configured to communicate custom data formats for the application, which may allow for the mobile device locating system 102 to any one of the at least one mobile devices 110A, 110Z.

Returning to FIG. 1, system 100 may include a mobile device locating system 102, which may include, for example, a processor 150, a memory 152, a mobile device locating computing device 154, a location prediction module 104, and at least one contextual database 106. Location prediction module 104 can be any suitable network server and/or other type of processing device, such as mobile device locating computing device 154. Contextual database 106 can be any suitable network database configured to store contextual mobile device data, such as data corresponding to the sharing relationship between any one of the mobile devices, the fixed location data corresponding to the location of known networking and/or communication equipment, such as a wireless local area network router and/or a cell phone tower. In this regard, mobile device locating system 102 may include for example, at least one backend data server, network database, cloud computing device, among other things. As discussed herein, the mobile devices 110A, 110Z may be any suitable mobile device, such as a cellular phone, tablet computer, smartphone, etc., or other type of mobile processing device that may be used for any suitable purpose.

As shown in FIG. 6, some embodiments of the present invention may provide a method for locating and/or predicting the location of a mobile device. An exemplary method, such as process 600, may be executed by one or more devices (some examples of which are discussed in connection with FIGS. 1 and 2) to provide the displays of FIGS. 4 and 5. Process 600 starts at 602. At 604, a mobile device locating system may receive mobile device contextual data. For example, a mobile device, such as any one of the mobile devices 110A, 110Z illustrated in FIG. 1, may be configured to transmit data corresponding to at least on contextual state of the mobile device. In one example, a mobile device 110A may be configured to transmit data corresponding to the velocity of the mobile device. In another example, the mobile device 110A may be configured to transmit data corresponding to accelerations of the mobile device. The mobile devices 110A, 110Z may be configured to transmit data corresponding to any number of contextual states of the mobile device, such as data corresponding to an audio recording of ambient noise recorded by the mobile device.

In addition, at 604, the mobile device locating system 102 may be configured to receive mobile device contextual data corresponding to sharing permission data. For example, a first mobile device 110A may be configured to transmit data to the mobile device locating system 102 that corresponds with the sharing permissions of the first mobile device. Specifically, the first mobile device may be configured to share location data with a second mobile device 110B, but not with a third mobile device 110C. In some embodiments, the mobile device may be configured to edit sharing permissions via a touch-sensitive display screen of the mobile device.

For example, FIG. 4 illustrates an example touch-sensitive display screen 400. With respect to FIG. 4, an application on a mobile device may be configured to indicate which users 406 have sufficient permission to view the location of the mobile device. In addition, the display 400 may include an online user status portion 403 and an offline user status portion 404. A user identifier 406, which may include an avatar 405, such as a picture of the user, may be placed in either an online user status portion 403 or an offline user status portion 404 based at least in part on whether the user has given sufficient permission to the user of the first mobile device to locate the user. For example, a first mobile device 110A may be configured to share location data with any number of users by, for example, having a user provide an indication to a slide bar displayed on the display 400 in a first position 401. In some embodiments, the first mobile device 110A may be configured to prohibit sharing location data with a particular user by, for example, having a user provide an indication to a slide bar displayed on the display 400 in a second position 402. Accordingly, the user of the first mobile device may change permission status as desired by sliding a slide bar between a first and second position. Although displayed as a slide bar in FIG. 4, one of ordinary skill in the art in light of this disclosure may appreciate that sharing permissions may be edited by receiving an indication of any type on a mobile device, such as a receiving a touch input corresponding to a touch element, such as a button, displayed on the touch-sensitive display 400.

According to some embodiments, the mobile device locating system 102, as shown in FIG. 1 for example, may be configured to store data corresponding to sharing permissions of any one of the mobile devices. In addition, the plurality of mobile devices may be configured to communicate with the mobile device locating system 102 such that when a first user provides an indication to a touch display corresponding to a change in sharing permissions for another user, the mobile device locating system 102 may be configured to receive an indication corresponding to the sharing permission change. As such, embodiments herein may advantageously provide for a mobile device locating system 102 configured to store data corresponding to the sharing permissions and/or user relationships of the plurality of mobile devices and their corresponding users.

Referring back to FIG. 6, a mobile device locating system 102 may be configured to then determine a velocity and acceleration of the mobile device at 606. For example, a mobile device locating system 102 may be configured to determine an acceleration of the mobile device 110A from data corresponding to the velocity of the mobile device over a given period of time. Accordingly, the mobile device locating system 102 may be configured to determine the acceleration of the mobile device from the velocity measurements taken at discrete times.

At 608, the mobile device locating system 102 may be configured to predict a future location of the mobile device, based at least in part on the contextual data received from the mobile device. In one example embodiment, the mobile device locating system 102 may use a Kalman filter or a Markov chain for predicting the future location of the mobile device. For example, the mobile device locating system 102 may use contextual data received from a mobile device that corresponds to the velocity of the mobile device and/or the acceleration of the mobile device. One of skill in the art may appreciate that any suitable graphical model may be used to predict the future location of the mobile device. As discussed in greater detail herein, the mobile device locating system 102 may be configured to determine a new location of the mobile device at 610. The process may end at 612.

FIG. 7 illustrates an exemplary method, such as process 700, for locating and/or predicting the location of a mobile device. An exemplary method, such as process 700, may be executed by one or more devices (some examples of which are discussed in connection with FIGS. 1 and 2) to provide the displays of FIGS. 4 and 5. Process 700 starts at 702.

At 704, a mobile device locating system 102 may be configured to receive mobile device contextual data. For example, referring to FIG. 1, a first mobile device 110A may be configured to transmit mobile device contextual data to the mobile device locating system 102 via network 101. In one example embodiment, multiple mobile devices 110A, 110B, 110C, 110D, 110E . . . 110Z may be configured to execute and run an application on the respective mobile devices that may be configured to determine the location of the respective mobile devices and/or the locations of any of the other mobile devices. For example, FIG. 5 illustrates a display 500 of an example application.

Referring to FIG. 5, the display 500 may include a map portion 510 and a detailed information portion 503. In addition, the application may be configured to display on a touch-sensitive display 500 of a first mobile device the locations 501, 502 of the mobile devices for other users that are currently online and have granted permission to the user of the first mobile device to access their respective locations. In addition, the display 500 may include button 504, which may be configured to, upon receiving a touch input thereto, to center the map portion 510 of the display to the location of the mobile device. Further, the display 500 may include button 505, which may be configured to, upon receiving a touch input thereto, to display at least one map and application settings editing portion onto the display 500.

As stated above, the application may be configured to display on a touch-sensitive display 500 of a first mobile device a detailed information portion 503 that may correspond to a selected location annotation 501 displayed on the display 500. Accordingly, the detailed information portion 503 may provide information corresponding to the selected location annotation 101, such as the user's name, the elapsed time since the location information has been updated, and/or the amount of time a user has been spent at a particular location. In addition, the application may be configured to transmit data corresponding to location of the first mobile device 110A to the mobile device locating system 102. For example, the first mobile device 110A may be configured to transmit data corresponding to the location of the mobile device and/or the area of the map portion 510 displayed on the display 500 of the mobile device, and accordingly, the mobile device locating system 102 may be configured to receive such data from the first mobile device 110A.

Further, any one of the mobile devices 110A, 110Z may be configured to transmit contextual data to the mobile device locating system 102, such as data corresponding to the respective mobile device's velocity, acceleration and/or the like. In addition, the mobile device locating system 102 may be configured to receive such contextual data at 704. For example, the mobile device locating system 102 may be configured to receive data corresponding to an audio recording, video recording and/or other signal recording of the at least one mobile device at 704.

At 706, the mobile device locating system may be configured to determine a velocity and acceleration of the at least one mobile device 110A. For example, a mobile device locating system 102 may be configured to determine an acceleration of the mobile device 110A from data corresponding to the velocity of the mobile device over a given period of time. Accordingly, the mobile device locating system 102 may be configured to determine the acceleration of the mobile device from the velocity measurements taken at discrete times.

At 708, the mobile device locating system 102 may be configured to predict a future location of the mobile device, based at least in part on the contextual data received from the mobile device. In one example embodiment, the mobile device locating system 102 may use a Kalman filter or a Markov chain for predicting the future location of the mobile device. For example, the mobile device locating system 102 may use contextual data received from a mobile device that corresponds to the velocity of the mobile device and/or the acceleration of the mobile device so as to determine whether or not the mobile device is in motion.

At 710, the mobile device locating system 102 may be configured to determine whether the predicted location of the mobile device meets an accuracy threshold. The mobile device locating system 102 may be configured to determine that a predicted location of the first mobile device 110A does not meet an accuracy threshold if, for example, the contextual data received by the mobile device locating system does not correspond to the predicted location. For example, a portion of the contextual data may indicate that a first velocity vector and acceleration vector of the mobile device is in the same direction, while a second velocity vector, corresponding to a velocity measurement taken subsequently to the first velocity vector measurement, of the mobile device points in an opposite direction. Accordingly, the velocity measurements and the acceleration vector may not correspond, which may cause the mobile device locating system 102 to determine that the predicted location of the first mobile device does not meet an accuracy threshold.

In some embodiments, where the predicted location of the mobile device meets an accuracy threshold, the mobile device locating system 102 may be configured to then transmit data corresponding to the predicted location of the mobile device as the new location of the mobile device. As such, in one embodiment, a first mobile device 110A may be configured to request the location of a second mobile device 110B. In addition, the first mobile device 110A and the second mobile device 110B may be configured to share their respective locations with one another, as indicated by the respective user via an application on the respective mobile device (e.g., an indication 401 corresponding to a sharing status on the display of a mobile device). Accordingly, at 712 of FIG. 7, a mobile device locating system 102 may be configured to transmit data to either of the first or second mobile devices 110A, 110B that corresponds to the predicted location of either of the mobile devices as the new location of the respective mobile devices. The process may then end at 726.

If the mobile device locating system 102 determines that the predicted location of the mobile device does not meet the accuracy threshold at 710, the mobile device locating system may be configured to receive data corresponding to a location of at least one device that is in communication with the mobile device. According to one embodiment, the mobile device locating system 102 may be configured to receive data of the location of a known networking and/or communication equipment device, such as a wireless local area network router and/or a cell phone tower. In some embodiments, the mobile device locating system may be configured to receive data corresponding to an estimated distance between the known device in communication with the mobile device and the mobile device. For example, a mobile device 110A may be configured to receive a signal from a mobile device locating system 102 corresponding to an indication that the mobile device locating system 102 determined the predicted location of the mobile device 110A did not meet an accuracy threshold. As such, the mobile device 110A may be configured to transmit data corresponding to the distance of the mobile device from a device in communication with the mobile device, such as a cell phone tower and/or the like. In some embodiments, the mobile device 110A may be configured to transmit data corresponding to the identity of the closest device that is in communication with the mobile device, such as networking equipment, a cell phone tower, and/or the like. Accordingly, the mobile device locating system 102 may be configured to receive data corresponding to the location of at least one device in communication with the mobile device.

In some embodiments, the mobile device locating system 102 may be configured to receive data corresponding to an identity of a device in communication with the mobile device. Further, the mobile device locating system 102 may be configured to retrieve data corresponding to the device in communication with the mobile device. For example, the contextual database 106 may include data corresponding to the location of known networking and/or communication equipment devices, such as a wireless local area network router and/or a cell phone tower. Accordingly, the mobile device locating system 102 may be configured to determine the location of the mobile device 110A based, at least in part, on the data corresponding to the at least one device in communication with the mobile device.

At 716, the mobile device locating system 102 may be configured to determine the location of the mobile device based on the data corresponding to the location of the at least one device in communication with the mobile device 110A. For example, a mobile device locating system 102 may be configured to receive data corresponding to a plurality of devices that are in communication with the mobile device. As such, the mobile device locating system 102 may be configured to determine the exact position based upon data corresponding to the distance of the mobile device from the location of three devices that are in communication with the mobile device, wherein the location of the three devices in communication with the mobile device are known, stored within the contextual database 106, and/or transmitted to the mobile device locating system 102. Accordingly, at 718, a mobile device locating system 102 may be configured to transmit data corresponding to the location of the mobile device based at least on the data corresponding to the location of the at least one device in communication with the mobile device.

In some embodiments, the mobile device locating system 102 may be configured to use the location of at least one device in communication with the mobile device, such as a cell phone tower, as a temporary location of the mobile device. For example, the mobile device locating system 102 may be configured to receive data corresponding to the location of a cell phone tower at 714. In one example embodiment, the data may further indicate that the mobile device is located within 1 mile of the cell phone tower. Accordingly, the mobile device locating system 102 may be configured to transmit data corresponding to the location of the cell phone tower as the temporary location of the mobile device at 718. The process 700 may then end at 726.

If the mobile device locating system 102 is unable to determine the location of the mobile device at 716, the mobile device locating system 102 may be configured to transmit a signal corresponding to a request for the mobile device location at 720. For example, if the mobile device locating system 102 is unable to determine the location of the mobile device, the mobile device locating system may transmit a signal to the mobile device indicating a request for the mobile device to transmit data corresponding to the location of the mobile device.

At 722, the mobile device locating system 102 may be configured to receive data corresponding to the current location of the mobile device. For example, in response to receiving a signal indicating a request for the mobile device's location, a mobile device may be configured to determine the location of the mobile device using any number of suitable methods, such as GPS locating technology. In some embodiments, the mobile device may be configured to communicate with a number of devices having fixed known locations, such as cell phone towers and/or networking equipment, such as a wireless local area network router. Accordingly, the mobile device may be configured to determine the distance of the mobile device from any number of these devices configured to communicate with the mobile device so as to determine the location of the mobile device. In some embodiments, the mobile device may be configured to communicate with devices that are configured to communicate with the mobile device, which have a location unknown to the mobile device locating system 102. Accordingly, the mobile device locating system 102 may not be able to determine the location of the mobile device at 716, but the mobile device may be configured to determine the location of the mobile device and transmit the corresponding data to the mobile device locating system such that the mobile device locating system receives data corresponding to the location of the mobile device at 722. As such, the mobile device locating system 102 may be configured to transmit data corresponding to the current location of a first mobile device 110A to at least one other mobile device at 724. The process ends at 726.

Accordingly, embodiments herein may advantageously provide for an efficient method of determining the location of a mobile device. Specifically, the mobile device locating system 102 may be configured to predict the location of a mobile device 110A, 110Z based at least upon contextual data of the at least one mobile device. As such, the mobile device may not need to determine the location of the mobile device and transmit data corresponding to the location of the mobile device to the mobile device locating system. In some embodiments, the mobile device may transmit contextual data corresponding to the mobile device, and the mobile device locating system 102 may be configured to determine the location of the mobile device from the contextual data. In another embodiment, the mobile device may be configured to transmit data corresponding to the location of at least one device in communication with the mobile device, such as data corresponding to the distance of the mobile device from a cell phone tower. As such, embodiments may advantageously provide for a method of determining the location of the mobile device without the mobile device having to determine the location of the mobile device. Further, embodiments may advantageously provide for determining the location of the mobile device using suitable methods, such as GPS locating technology, when the mobile device locating system is unable to accurately predict the location of the mobile device.

FIG. 2 illustrates a schematic block diagram of circuitry 200, some or all of which may be included in, for example, mobile device locating system 102, mobile device locating computing device 154, and/or mobile devices 110A,110Z. As illustrated in FIG. 2, in accordance with some example embodiments, circuitry 200 may include various means, such as a processor 202, memory 204, communication module 206, input/output module 208 and/or location prediction module 210.

In some embodiments, such as when circuitry 200 is included in a mobile device locating system 102 and/or mobile device 110A, a location prediction module 210 may be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 comprises a plurality of processors. The plurality of processors may be embodied on a single computing device or may be distributed across a plurality of computing devices collectively configured to function as circuitry 200. The plurality of processors may be in operative communication with each other and may be collectively configured to perform one or more functionalities of circuitry 200 as described herein. In an example embodiment, processor 202 is configured to execute instructions stored in memory 204 or otherwise accessible to processor 202. These instructions, when executed by processor 202, may cause circuitry 200 to perform one or more of the functionalities of circuitry 200 as described herein.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA or the like, processor 202 may comprise specifically configured hardware for conducting one or more operations described herein. As another example, when processor 202 is embodied as an executor of instructions, such as may be stored in memory 204, the instructions may specifically configure processor 202 to perform one or more algorithms and operations described herein.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing device or distributed across a plurality of computing devices. In various embodiments, memory 204 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 204 may be configured to store information, data, applications, instructions, or the like for enabling circuitry 200 to carry out various functions in accordance with example embodiments discussed herein. For example, in at least some embodiments, memory 204 is configured to buffer input data for processing by processor 202. Additionally or alternatively, in at least some embodiments, memory 204 may be configured to store program instructions for execution by processor 202. Memory 204 may store information in the form of static and/or dynamic information. This stored information may be stored and/or used by circuitry 200 during the course of performing its functionalities.

Communications module 206 may be embodied as any device or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications with another computing device. Communications module 206 may be configured to receive and/or transmit any data that may be stored by memory 204 using any protocol that may be used for communications between computing devices. Communications module 206 may additionally or alternatively be in communication with the memory 204, input/output module 208 and/or any other component of circuitry 200, such as via a bus.

Input/output module 208 may be in communication with processor 202 to receive an indication of a user input and/or to provide an audible, visual, mechanical, or other output to a user. Some example visual outputs that may be provided to a user by circuitry 200 are discussed in connection with the displays described above. As such, input/output module 208 may include support, for example, for a keyboard, a mouse, a joystick, a display, an image capturing device, a touch screen display, a microphone, a speaker, a RFID reader, barcode reader, biometric scanner, and/or other input/output mechanisms. In embodiments wherein circuitry 200 is embodied as a server or database, aspects of input/output module 208 may be reduced as compared to embodiments where circuitry 200 is implemented as an end-user machine (e.g., a mobile device) or other type of device designed for complex user interactions. In some embodiments (like other components discussed herein), input/output module 208 may even be eliminated from circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the drawing (like the other components discussed herein).

Location prediction module 210 may also or instead be included and configured to perform the functionality discussed herein related to facilitating the determination of a location of a mobile device, as discussed above. In some embodiments, some or all of the functionality related facilitating the determination of a location of a mobile device may be performed by processor 202. In this regard, the example processes and algorithms discussed herein can be performed by at least one processor 202 and/or location prediction module 210. For example, non-transitory computer readable storage media can be configured to store firmware, one or more application programs, and/or other software, which include instructions and other computer-readable program code portions that can be executed to control processors of the components of system 200 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatuses circuitry to produce a machine, such that the computer, processor or other programmable circuitry that executes the code may be the means for implementing various functions, including those described herein.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

That which is claimed:

1. A method for tracking a location of a first mobile device following a request generated by a second mobile device, the method comprising:
- receiving contextual data associated with the first mobile device via a connection with the first mobile device;
- determining a first velocity vector and a first acceleration vector of the first mobile device from the contextual data;
- predicting, based at least in part on one or more graphical models, a future location of the first mobile device based at least in part on the first velocity vector and the first acceleration vector;
- determining the location of the first mobile device;
- determining whether the predicted future location meets an accuracy threshold based at least in part on the location of the first mobile device;
- in response to determining that the predicted future location meets the accuracy threshold, determining a sharing permissions status with respect to the second mobile device; and
- transmitting location data corresponding to the predicted future location of the first mobile device to the second mobile device based on the sharing permissions status.

2. The method of claim 1, wherein determining the location of the first mobile device comprises:
- determining a second velocity vector and a second acceleration vector corresponding to measurements taken subsequent to measurements of the first velocity vector and the first acceleration vector; and
- determining whether the predicted future location meets the accuracy threshold based at least in part on whether the predicted future location corresponds with the second velocity vector and the second acceleration vector.

3. The method of claim 1, wherein the contextual data further comprises at least one of:
- mobile device audio data;
- mobile device video data;
- mobile device velocity data; and
- mobile device acceleration data.

4. The method of claim 1, further comprising:
- receiving one or more location data requests from at least one other mobile device; and
- transmitting the location data based at least in part on a sharing permissions status with respect to the at least one other mobile device following determining that the predicted future location meets the accuracy threshold.

5. The method of claim 4, further comprising:
- determining whether any duplication exists between any of the one or more location data requests.

6. The method of claim 1, wherein the one or more graphical models include at least one of a Kalman filter or a Markov chain.

7. The method of claim 1, wherein the connection with the first mobile device is an open socket connection established via a prioritized communication protocol.

8. A computer program product for enabling tracking of a location of a first mobile device following a request generated by a second mobile device, the computer program product comprising at least one non-transitory computer-readable storage medium having computer-readable program code portions stored therein, the computer-readable program code portions comprising an executable portion configured to:
- receive contextual data associated with the first mobile device via a connection with the first mobile device;
- determine a first velocity vector and a first acceleration vector of the first mobile device from the contextual data;
- predict, based at least in part on one or more graphical models, a future location of the first mobile device based at least in part on the first velocity vector and the first acceleration vector;
- determine the location of the first mobile device;
- determine whether the predicted future location meets an accuracy threshold based at least in part on the location of the first mobile device;
- in response to determining that the predicted future location meets the accuracy threshold, determine a sharing permissions status with respect to the second mobile device; and
- transmit location data corresponding to the predicted future location of the first mobile device to the second mobile device based on the sharing permissions status.

9. The computer program product of claim 8, wherein determining the location of the first mobile device comprises:
- determining a second velocity vector and a second acceleration vector corresponding to measurements taken subsequent to measurements of the first velocity vector and the first acceleration vector; and
- determining whether the predicted future location meets the accuracy threshold based at least in part on whether the predicted future location corresponds with the second velocity vector and the second acceleration vector.

10. The computer program product of claim 8, wherein the contextual data further comprises at least one of:
- mobile device audio data;
- mobile device video data;
- mobile device velocity data; and
- mobile device acceleration data.

11. The computer program product of claim 8, wherein the at least one non-transitory computer-readable storage medium having computer-readable program code portions stored therein, further configure the computer-readable program code portions to:
- receive one or more location data requests from at least one other mobile device; and
- transmit the location data based at least in part on a sharing permissions status with respect to the at least one other mobile device following determining that the predicted future location meets the accuracy threshold.

12. The computer program product of claim 11, wherein the at least one non-transitory computer-readable storage medium having computer-readable program code portions stored therein, further configure the computer-readable program code portions to:

determine whether any duplication exists between any of the one or more location data requests.

13. The computer program product of claim 8, wherein the one or more graphical models include at least one of a Kalman filter or a Markov chain.

14. The computer program product of claim 8, wherein the connection with the first mobile device is an open socket connection established via a prioritized communication protocol.

15. An apparatus configured to enable tracking of a location of a first mobile device following a request generated by a second mobile device, the apparatus comprising at least one processor and at least one non-transitory memory including computer-coded instructions thereon, the computer coded instructions, with the at least one processor, configure the apparatus to:

receive contextual data associated with the first mobile device via a connection with the first mobile device;

determine a first velocity vector and a first acceleration vector of the first mobile device from the contextual data;

predict, based at least in part on one or more graphical models, a future location of the first mobile device based at least in part on the first velocity vector and the first acceleration vector;

determine the location of the first mobile device;

determine whether the predicted future location meets an accuracy threshold based at least in part on the location of the first mobile device;

in response to determining that the predicted future location meets the accuracy threshold, determine a sharing permissions status with respect to the second mobile device; and transmit location data corresponding to the predicted future location of the first mobile device to the second mobile device based on the sharing permissions status.

16. The apparatus of claim 15, wherein determining the location of the first mobile device comprises:

determining a second velocity vector and a second acceleration vector corresponding to measurements taken subsequent to measurements of the first velocity vector and the first acceleration vector; and determining whether the predicted future location meets the accuracy threshold based at least in part on whether the predicted future location corresponds with the second velocity vector and the second acceleration vector.

17. The apparatus of claim 15, wherein the contextual data further comprises at least one of:

mobile device audio data;

mobile device video data;

mobile device velocity data; and mobile device acceleration data.

18. The apparatus of claim 15, wherein the computer coded instructions are further configured to, with the at least one processor, cause the apparatus to:

receive one or more location data requests from at least one other mobile device; and transmit the location data based at least in part on a sharing permissions status with respect to the at least one other mobile device following determining that the predicted future location meets the accuracy threshold.

19. The apparatus of claim 18, wherein the computer coded instructions are further configured to, with the at least one processor, cause the apparatus to:

determine whether any duplication exists between any of the one or more location data requests.

20. The apparatus of claim 15, wherein the one or more graphical models include at least one of a Kalman filter or a Markov chain.

* * * * *